Feb. 25, 1941.  F. JOHNSKE ET AL  2,233,374
RADIO DIRECTION FINDER
Filed June 1, 1939   2 Sheets-Sheet 1

Inventors
Fritz Johnske
Johannes Rebmann
By Josef Linke
Attorney

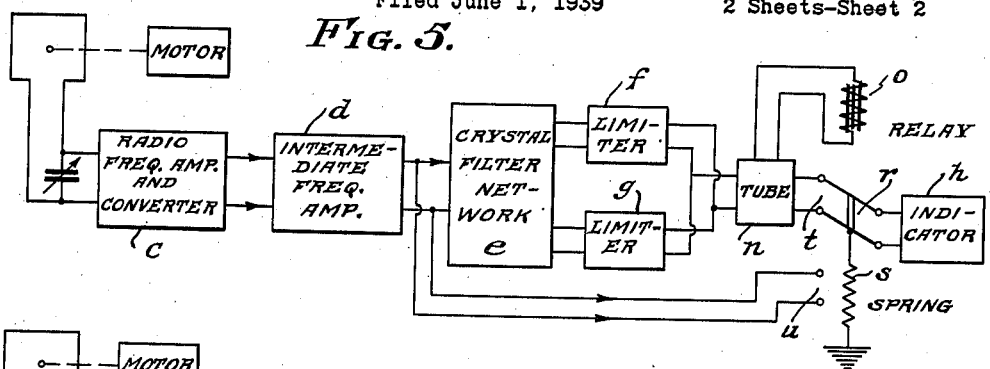
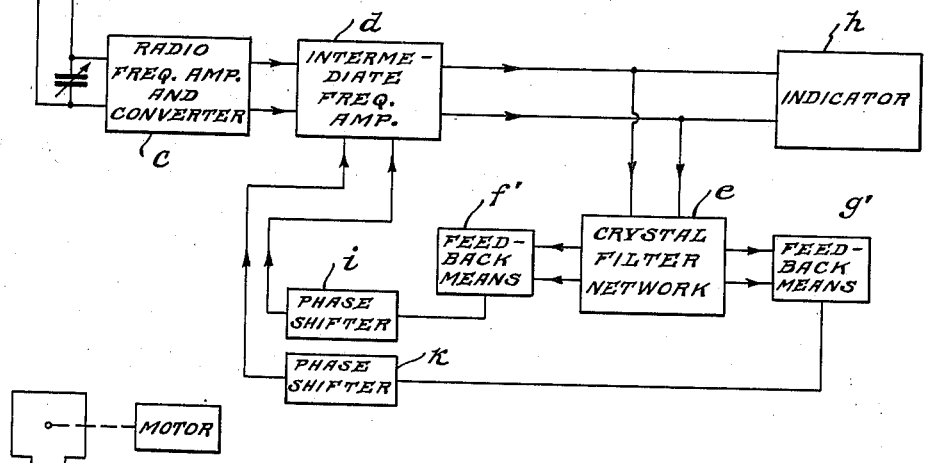
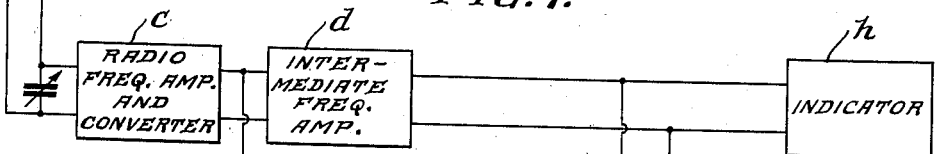
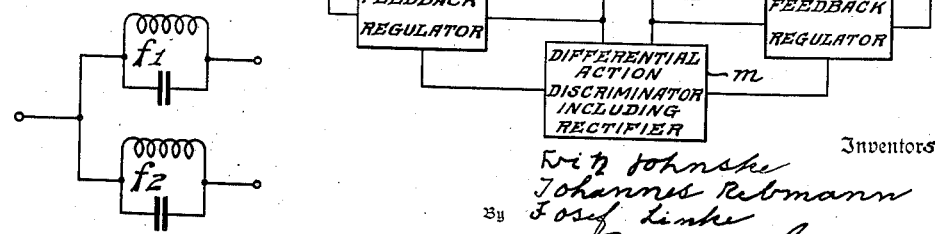

Patented Feb. 25, 1941

2,233,374

UNITED STATES PATENT OFFICE 2,233,374

RADIO DIRECTION FINDER

Fritz Johnske, Johannes Rebmann, and Josef Linke, Berlin, Germany, assignors to Telefunken Gesellschaft für Drahtlose Telegraphie m. b. H., Berlin, Germany, a corporation of Germany Application June 1, 1939, Serial No. 276,902
In Germany June 4, 1938

7 Claims. (Cl. 250—11)

Figure 1:
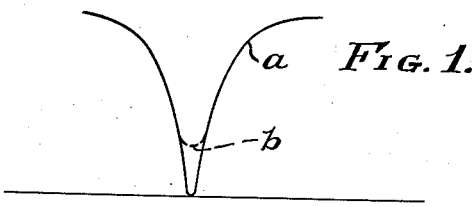

The present invention is concerned with direct indicating direction finders in which the direction finding means, for example, a goniometer coil, is constantly rotated and is connected to oscillographing means which make visible the direction finding data available at the output end of the receiver. In auditory reading of direction finding signals, quadrature effects or blurring due to reflections result in a signal minimum which is not an absolute zero. Such blurring of the zero position in the direction finding pattern of a rotating visible direction finder has the result that the directional curve $a$ as shown in Fig. 1, for instance, is flattened at the bottom end and that the valley fails to go down all the way to the zero level as indicated at $b$. Now, these effects, in the revolving direction finder as well as in sound reading of signals may be eliminated by feeding the radio frequency potential picked up by a non-directional antenna, for the compensation of the blurring potential, with suitable amplitude and phase, to the input circuit of the direction finding receiver. This may be accomplished, for example, by the adjustment of a differential condenser serving for coupling. This mode of making the zero or minimum position sharper requires an additional operating knob, and a resulting time consuming adjustment. This fact is more serious in direct visual reading of direction finding signals than in auditory reading thereof.

Suggestions have been disclosed in the prior art to render automatically the minimum or zero position sharper by eliminating blurring effects. For example, a differential condenser may be automatically revolved to eliminate constantly revolving the circuit elements serving such effects. Now while suggestions of this nature constitute merely an expedient development of such circuit means as are customary in ear-reading direction finding signals and therefore constitute mere makeshifts, the present invention discloses ways and means designed for an automatic elimination of blurring effects which follows directly and logically from the very nature of the revolving direction finder by utilizing and relying upon electrical actions which arise only in connection with the revolving direction finder.

Figure 2:
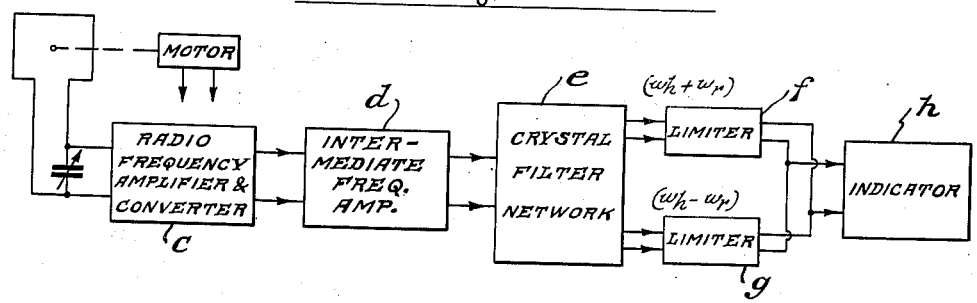

The invention will be described by reference to the accompanying drawings in which Fig. 1 is a graph illustrating the blurring effect; Fig. 2 is a schematic circuit diagram of one embodiment of the invention; Figs. 3 through 7 are modifications of the invention; and Fig. 8 is a schematic diagram of an element of the invention. Similar reference numerals will be used to identify similar elements of the several figures.

For a more thorough understanding of the basic idea of the invention, there shall first be explained certain particular electrical actions on the basis of the mathematical expression which applies to this case: In taking directional signals from a transmitter which arrive at the receiver with a frequency $\omega_h$ and a maximum amplitude $U_0$, a voltage will arise at the input circuit of the receiver, when the direction finding coil is revolved at a frequency of rotation $\omega_r$, which, each instant, is determined by the expression:

(a) $\mu = U_0 \cos \omega_h \cdot \cos \omega_r t$
(b) $\mu = \frac{1}{2} U_0 [\cos (\omega_h + \omega_r) t + \cos (\omega_h - \omega_r) t]$ In other words, what arises in the input circuit of the receiver are two side bands being spaced apart by a frequency equal to twice the frequency of rotation; and these mutually neutralize in the direction finding minimum because of phase opposition, if their amplitudes are alike. What follows, inversely, from Expression $b$ is that a blurring or similar effect is able to arise only when the said two side-bands are unequal in amplitude.

Now, it is this fact and idea upon which the present invention is predicated. To be more precise, the basic object is to provide means for automatically eliminating such blurring and similar effects, as may be present, by using automatic regulator means which by positive action will maintain the side bands at an equal level. The arrangement of the invention designed to make the zero of signal potentials furnished from a revolving direct finder system automatically sharp comprises regulator means operating automatically or manually whereby the two side bands obtained by rotation of the antenna system and being either radio frequency or intermediate frequency are kept at an equal amplitude.

The means adapted to insure such absolute equality of the amplitudes of two different radio frequency oscillations are known in the earlier art. Therefore, by reference to the exemplified embodiments schematically illustrated in Figs. 2 to 7, it shall only be shown here in what particular manner this state of the art may be relied upon for a solution of the present problem in the most suitable manner. Common to all of the exemplified embodiments is the provision of a dividing network comprising quartz crystals. The system may include, for example, a six-terminal network furnished with quartz crystal filters which will pass or transmit only the two frequencies ($\omega_h+\omega_r$) and ($\omega_h-\omega_r$) and will conduct them separately to the respective output terminals. Such a crystal dividing network, according to another object of the present invention, is directly included in the receiver channel or in a side channel thereof. The side bands separated by such a dividing network are thereupon fed to distinct regulator means (limiters or levelers). These insure an amplitude regulation of the two side bands in such a way that the two side band frequencies reach the final amplifier with equal amplitudes. In the exemplified embodiments which comprise intermediate frequency amplification, the expression representing intermediate frequency must be introduced in the equations instead of $\omega_h$.

Fig. 2 illustrates an embodiment of the invention which operates with conventional amplitude limiters; $c$ indicates the radio frequency, $d$ is the intermediate frequency portion, $e$ the crystal dividing network designed to separate the two side band frequencies whence they are fed to distinct amplitude limiters $f$ and $g$. Amplitude limiters of this kind are well known in the prior art so that there will be no necessity to go into details here. Now, these two amplitude limiters $f$ and $g$ have this sole function to render the amplitudes of the two side band frequencies equal to teach other at each instant. The potentials coming from the said amplitude limiters or stabilizers $f$ and $g$ are thereupon fed to another part of the direction finding receiver indicated at $h$.

Figure 3:
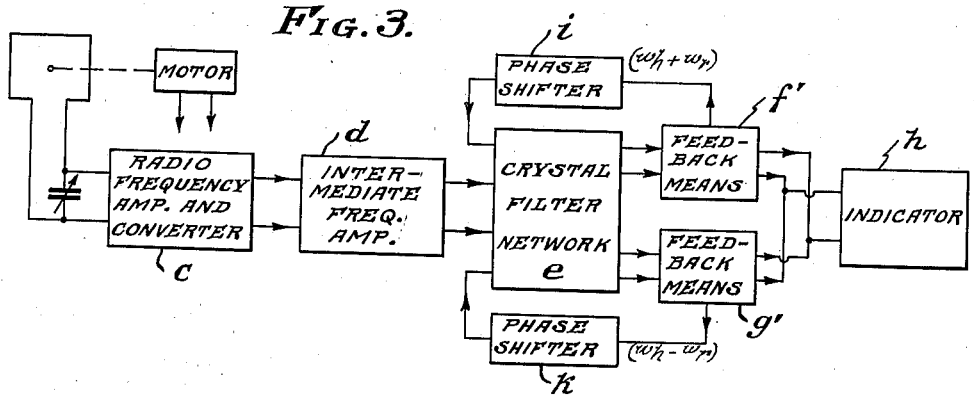

In the embodiment illustrated in Fig. 3, the potentials coming from the quartz crystal dividing network $e$ are fed back by way of means $f'$ and $g'$ to the radio frequency or intermediate frequency portion of the receiver. In order that a phase shift of the side band frequencies may be effected, phase shifting means are included in the feedback conductors as indicated at $i$ and $k$, respectively. Regulation is accomplished in such a way that the side band frequencies filtered by the crystal dividing network $e$ are superposed upon the signal frequencies in phase opposition so that in this way an amplitude-dependent feedback is obtained. For instance, by means $f'$ an oscillation having a frequency $\omega_h+\omega_r$ is negatively fed back to a preceding amplifier stage, while means $g'$ insures a negative feedback or oscillation of frequency $\omega_h-\omega_r$. In other words, in case of inequality of the two side bands, amplitude stabilization is insured by virtue of the fact that the weaker side band is less attenuated than the stronger one. The two side band amplitudes by this mode of regulation will be forced to assume an absolute equal value or level independently one of the other.

Figure 4:
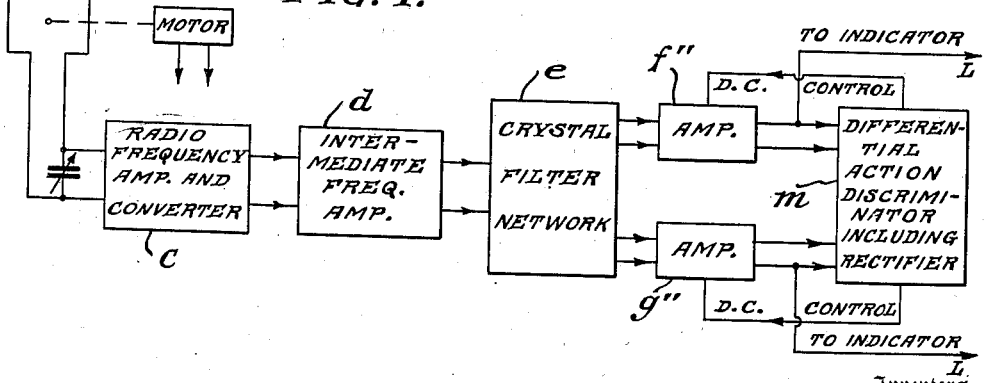

Contradistinct to the exemplified embodiments before disclosed in which radio frequency or intermediate frequency potentials are fed to preceding amplifier stages, Fig. 4 shows an exemplified embodiment designed for regulation by D. C. potentials. The two side bands are amplified in the regulating amplifier stages $f''$ and $g''$, whence they are fed over line L to the direction finder indicator or additional stages of amplification of the direction finder. At the same time, the output potentials of $f''$ and $g''$ are impressed upon a differential action (discriminator) arrangement comprising a rectifier $m$ which, according to whether the side band amplitude output of the amplifiers $f''$ or of $g''$ predominates, will furnish either positive or negative D. C. voltages to the grids of tubes in the amplifiers $f''$ or $g''$. In this manner the regulator amplifier stage delivering a higher output potential is automatically biased negatively, while the one with the lower output potential is biased in a positive sense.

The differential or discriminator arrangement $m$, for instance, may consist of a bridge arrangement of a kind known in the prior art; for example, as disclosed in U. S. Patent No. 2,088,203 which issued to C. W. Hansell on July 27, 1937. But it is also possible to feed the two potentials furnished from the regulating amplifiers $f''$ and $g''$ by way of the windings of a polarized relay and to connect through the said polarized relay circuits adapted to produce D. C. biasing voltages to be impressed upon the tubes of regulating amplifiers $f''$ and $g''$, respectively.

In the exemplified embodiments of the invention so far described, the crystal filters narrow the band width of the receiver. Thus, in the presence of a frequency of rotation of the goniometer of 20 cycles per second, the band width would be about 40 cycles. However, inasmuch as the frequency of the incoming transmitters will not be constant and stable inside this range, it follows that in case of departure amounting to a few cycles of the transmitter frequency from exact tuning, no direction finding signals would be available from these stations. If it is remembered that transient frequency fluctuations or drifts of about 100 cycles per second and over may be expected, it is necessary to so modify the basic idea of the invention that the transmission channel properly so-called has a normally greater band width and that automatic elimination of blurring effects (by the aid of the crystal dividing network included in a side channel of the main transmission channel) is operative only in the presence of exact tuning to the transmitter station frequency. In the presence of inaccurate tuning, the automatic night effect regulation means becomes ineffective.

Fig. 5 shows a schematic circuit arrangement for such automatic regulation. This circuit arrangement operates on the basis of the same principle as the one which underlies the embodiment shown in Fig. 2. The reference characters $f$ and $g$ again denote the two amplitude limiters, the output potentials of which are jointly fed to a tube arrangement $n$. If a current is flowing in the anode circuit of this tube arrangement $n$, a relay $o$ will be energized which will actuate the switch device $r$ in such a way that crystal dividing network $e$, the amplitude limiters or filters $f$ and $g$ and the tube arrangement $n$ are cut in the receiving channel. The switch $r$ will then occupy the switch position marked $t$. In all other cases, that is to say, in the presence of zero resultant potential in the output of the two amplitude limiters $f$ and $g$, the relay $o$ will become de-energized and the switch device $r$ is restored to the switch operating position $u$ by the aid of a mechanical spring $s$. In this position of the switch the crystal dividing network $e$ and the regulating amplifiers $f$ and $g$ are off. The receiver in this case has the normal band width and is enabled to indicate a transmitter by the conventional ways and means even in the presence of inaccurate tuning for which no potential is passed through the crystal dividig network.

In order that also in the solution of the basic principle of the invention shown in Fig. 3, signals from a transmitter may be indicated in the case of fluctuations of the transmitter frequency, an embodiment is shown in Fig. 6 in which the crystal dividing network e and the regulating means f' and g' are included in a side channel of the receiver circuit. Feedback, as to the rest, is effected in the same way as illustrated in the solution shown in Fig. 3.

The embodiments hereinbefore described by way of example may be expanded and combined in a great many ways, inside the scope and spirit of the invention. Such a combination shall now be described briefly by reference to the embodiment shown in Fig. 7. The crystal dividing network e is included in a side channel of the receiver circuit. It feeds its signal potentials, on the one hand, to the two feedback regulators f''' and g''', and, on the other hand, to the differential arrangement (discriminator) comprising rectifier m. The two feedback regulators f''' and g''' apply a feedback potential to ap receding amplifier stage each according to the amplitude of the side bands pertaining thereto. If in the feedback regulator f''' the side band arises with a larger amplitude, then, for instance, by way of the differential arrangement comprising rectifier m a positive D. C. voltage will be impressed upon the tube grid of f''', with the result that the negative feedback potential from f''' is increased. Thus, what happens fundamentally is that the differential regulator or discriminator by the production of positive or of negative grid biasing voltages influences the amplitude of the radio frequency or intermediate frequency feedback potentials in an equalizing sense.

By automatic stabilization of the amplitudes of the side band frequencies as outlined in connection with the exemplified embodiments hereinbefore described there is insured at the same time a check-up on the exact tuning of the direction finding receiver apparatus. This checkup is obtained in that the regulator action such as described by reference to Figs. 5 to 7 will be initiated only in the presence of exact tuning. Hence, by using the arrangement disclosed in the present invention it becomes feasible to eliminate directional errors of a kind caused by inexact tuning.

If by virtue of the particular construction of a dividing network similar to Fig. 8, each side band ($\omega_h + \omega_r$) and ($\omega_h - \omega_r$) is caused to flow through a particular circuit coordinated to it (f1 and f2 respectively), then neither side band will experience a phase shift. However, inasmuch as the relative phase position of the side bands governs the position of the directional minimum or zero inside the indicator scale, there occurs in this case no displacement of this direction-finding minimum point, that is to say, there is no directional error which is due to the receiver apparatus. But if both side bands conjointly pass an (optionally composite) resonance circuit whose resonance frequency, as is usual, lies midway between the two side band frequencies, there will arise equal and opposite phase shifts of the side bands and thus shifts of the direction finder minimum; these will grow with decreasing band width and are liable to assume appreciable proportions.

The arrangement of the invention thus provides a means for direct visual reading direction finders insuring extremely sharp tuning and free from directional errors due to the receiver apparatus.

We claim as our invention:

1. A direction finder including a directional antenna, means for rotating continuously said antenna, an indicator responsive to currents derived from said antenna for indicating the position of the fronts of waves impressed upon said antenna with respect to a reference line, and means connected between said indicator and said antenna for stabilizing the relative amplitudes of the side bands created by the rotation of said directional antenna in the fields of said waves.

2. In a device of the character of claim 1 in which the stabilizing means includes a filter for separating the currents of side band frequency and limiter means for equalizing the relative amplitudes of said separated currents.

3. A directional radio device including a directional antenna, means for rotating continuously said antenna, an indicator responsive to currents derived from said antenna for indicating the relative position of the fronts of waves impressed upon said antenna with respect to a reference line, means for separating the currents of side band frequencies created by the rotation of said antenna within the fields of said waves, and means for feeding back a component of said separated currents in proper phase to maintain substantially equality of amplitudes of said currents of side band frequencies.

4. In a device of the character of claim 3, means for shifting the phase of said feedback currents.

5. In a device of the character of claim 1 in which said last named means includes a differential discriminator and a rectifier for deriving direct current potentials, and means for regulating the relative amplitudes of said side bands as a function of said direct current potentials applied to said stabilizing means.

6. In a device of the character of claim 1, a relay interposed between said indicator and said stabilizing means for disconnecting said stabilizing means in response to mistuning of said system.

7. In a device of the character of claim 3, a differential discriminator and a rectifier for deriving a direct current potential and means for applying said direct current potential to said feedback means for regulating said feedback as a function of said direct currrent potentials.

FRITZ JOHNSKE.
JOHANNES REBMANN.
JOSEF LINKE.